United States Patent [19]

Skinner

[11] 4,242,164
[45] Dec. 30, 1980

[54] GASKET FOR SEALING A PIPE IN A PORTHOLE

[76] Inventor: Harry W. Skinner, 4609 St. Joe Ct. Rd., Fort Wayne, Ind. 46815

[21] Appl. No.: 951,189

[22] Filed: Oct. 13, 1978

[51] Int. Cl.³ .............................................. F16J 15/02
[52] U.S. Cl. ................................. 156/304.1; 264/148; 264/177 R; 264/295; 264/347; 277/207 A
[58] Field of Search ............... 264/295, 296, 230, 347, 264/148, 177 R; 277/207 A, 164; 156/122, 304

[56] References Cited

U.S. PATENT DOCUMENTS

| | | | |
|---|---|---|---|
| 1,794,192 | 2/1931 | Lower | 264/295 |
| 3,406,988 | 10/1968 | Jones | 285/24 |
| 3,656,771 | 4/1972 | Stout | 277/207 A |
| 3,700,265 | 10/1972 | Dufour et al. | 285/15 |
| 3,759,280 | 9/1973 | Swanson | 137/363 |
| 3,866,925 | 2/1975 | Maimstrom et al. | 277/164 |
| 3,871,937 | 3/1975 | Hollingsead et al. | 156/304 |
| 3,958,280 | 5/1976 | Smith | 4/52 |
| 3,958,313 | 5/1976 | Rossborough | 29/157 R |
| 3,973,783 | 8/1976 | Skinner et al. | 285/189 |
| 4,103,901 | 8/1978 | Ditcher | 29/235 |

*Primary Examiner*—Jeffery R. Thurlow
*Attorney, Agent, or Firm*—Gust, Irish, Jeffers & Hoffman

[57] ABSTRACT

This invention relates to a gasket apparatus for providing a fluid tight seal between a pipe and a porthole in the wall of a manhole riser. The gasket is in the form of an elongated sleeve of elastomeric material having at one end an outwardly turned, reflexly curved annular flange. The body portion extends axially beyond the flange. An annular recess is provided in the inner surface of the flange and another annular recess is provided on the outer surface of the body portion at the opposite end thereof. The flange and body portion are made sufficiently flexible that they can be turned inside out to form a tubular shape with the two recesses on the outer circumference thereof.

The recess in the flange is so formed as to receive in coaxial relation a rigid reinforcing ring.

4 Claims, 7 Drawing Figures

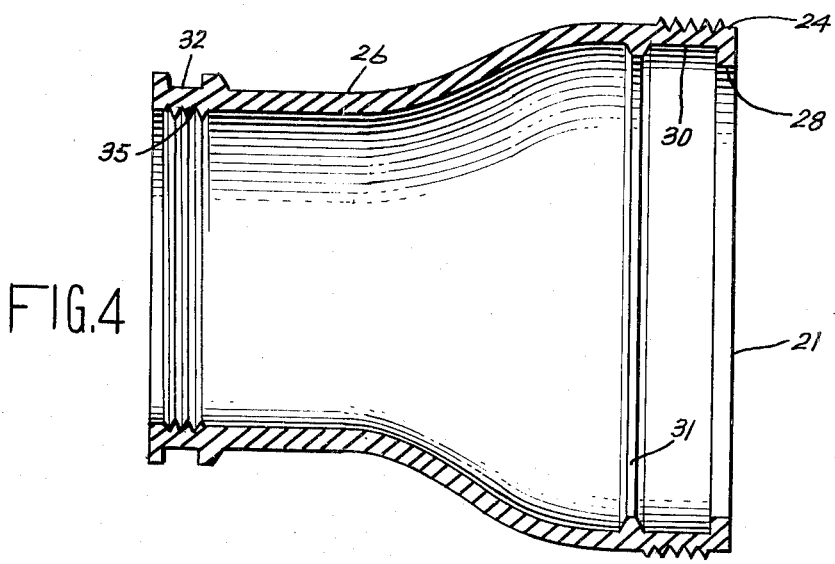
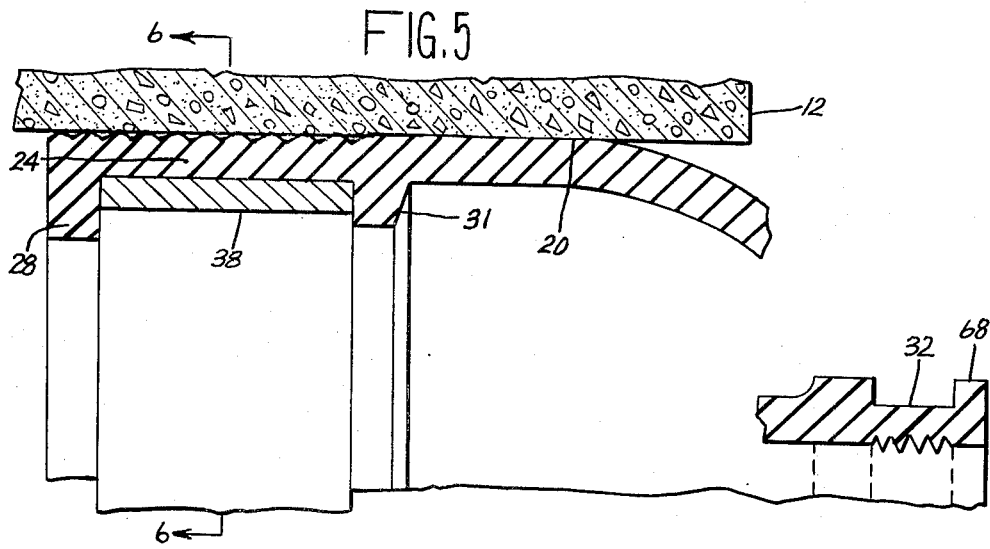
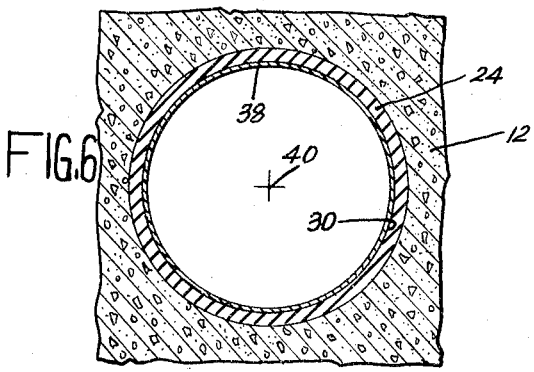
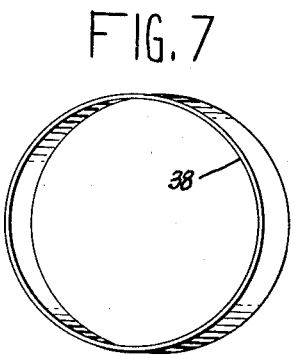

GASKET FOR SEALING A PIPE IN A PORTHOLE

BACKGROUND OF THE INVENTION

1. Field of the Invention

The present invention relates to sealing gasket arrangements and more particularly to sealing between the porthole in a manhole riser and a horizontally extending pipe fitted thereinto.

2. Description of the Prior Art

Prior art patents bearing some similarity to the present invention include U.S. Pat. Nos. 3,406,988; 3,656,771; 3,700,265; 3,759,280; 3,866,925; and 3,958,280. These patents variously relate to the provision of annular elastomeric gaskets which sealingly fit between the end of a pipe and the hole in another member for preventing leakage between the hole and the exterior of the pipe. In particular, U.S. Pat. Nos. 3,406,988; 3,759,280 and 3,958,313 disclose the use of sleeve-like gaskets having the exteriors at one end sealed to the wall of the hole and the opposite end sealed to either the interior or exterior of a joined pipe. The sealing of the one end to the wall of the hole is also variously achieved, one technique being to cast a radial flange on the sleeve into the concrete of the body containing the hole, and another being to seal this flange against the exterior of the wall containing the hole by means of a steel or the like clamping ring. Still another arrangement involves inserting the gasket loosely into a hole followed by inserting an expandible split ring inside the gasket and then radially forcing the ring to an enlarged, expanded size for radially compressing the gasket against the wall of the hole. A still further arrangement is to drive a tapered tubular wedge into the gasket loosely installed in the hole for radially compressing the gasket against the wall of the hole.

In the application entitled "Gasket Apparatus and Method", Harry W. Skinner and Alan D. Burdick, joint inventors, Ser. No. 936,122 and filed on Aug. 23, 1978, there is disclosed a sleeve-like gasket composed of a tubular body portion and a reflexly turned flange. A rigid clamping ring is fitted to the interior of the flange and the assembly then inserted into a porthole in the wall of a manhole riser.

SUMMARY OF THE INVENTION

This invention relates to a gasket device and method for making the same. The method includes the steps of forming a gasket of elastomeric material to a shape having a sleeve-like body with a reflexly turned flange on the end thereof which encircles at least a portion of the body, a first annular coaxial rib on the inner surface of the flange adjacent the end thereof and extending toward the body, and a second annular coaxial rib on the surface of the body adjacent the end opposite the flange, and then turning the gasket inside out thereby to form a tubular sleeve and position the first and second ribs on the inside and outside, respectively, of the sleeve.

The gasket of this invention is of elastomeric material and includes a tubular body portion having a reflexly turned flange on one end which encircles at least a portion of the body portion, an annular recess coaxially provided in the inner surface of a flange and another annular recess on the outside of the body portion adjacent the opposite end thereof. The recesses are so arranged that upon turning the flange and body portion inside out, both recesses will be on the exterior of the resulting tubular shape.

It is an object of this invention to provide a gasket for connecting the end of a pipe to a hole in a wall of concrete or the like in sealed relation.

It is another object of this invention to provide such a gasket wherein the gasket is initially formed of elastomeric material to have a reflexly turned flange overlying a portion of a tubular body and which may be turned inside out thereby to form a tubular shape wherin the flange axially extends beyond the tubular body.

Still another object of this invention is to provide a method for forming a tubular sealing gasket.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 4 is a similar view of the gasket but turned inside out and ready for installation;

FIG. 5 is a fragmentary view, partly sectioned and partly broken away, of a gasket of this invention installed in the porthole of a manhole riser;

FIG. 6 is a cross-section taken substantially along section line 6—6 of FIG. 5; and FIG. 7 is a perspective view of the clamping ring appearing in FIGS. 5 and 6.

DESCRIPTION OF THE PREFERRED EMBODIMENT

Figure 1:
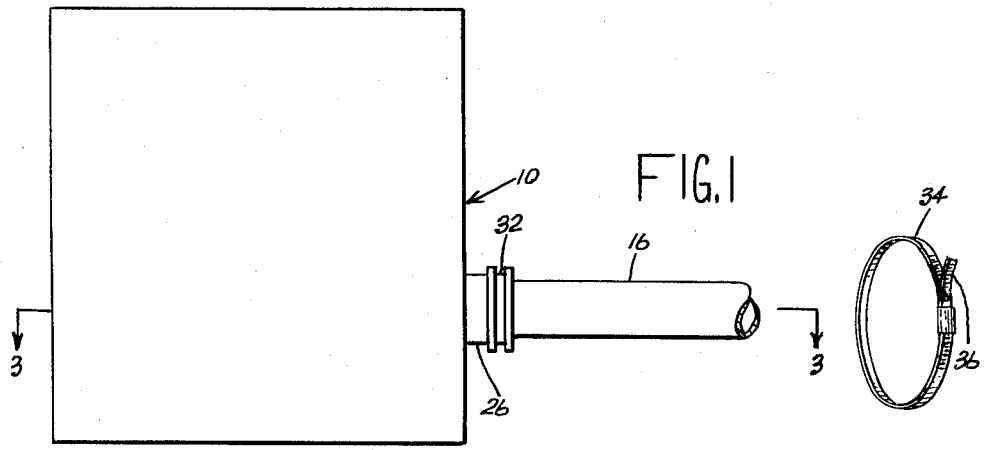
FIG. 1 is a side view of a typical manhole or manhole riser having a section of pipe laterally extending therefrom and connected to a porthole in the manhole by means of a gasket apparatus of this invention.
Figure 2:
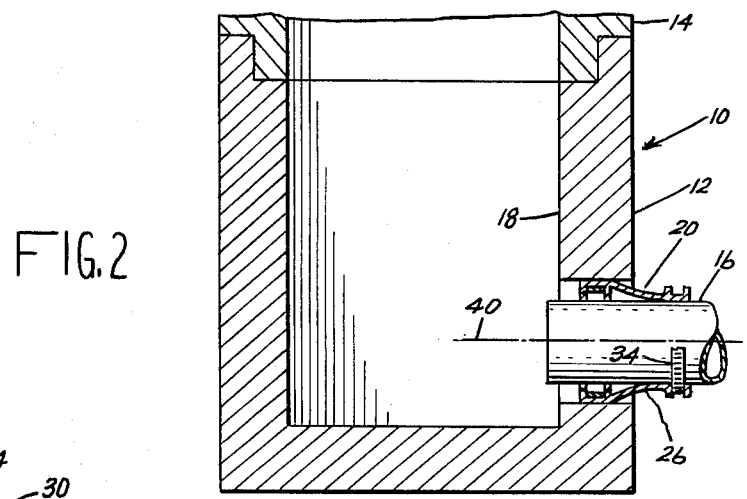
FIG. 2 is a partial vertical section of the embodiment of FIG. 1.

Referring to the drawings, and more particularly to FIGS. 1 and 2, a reinforced concrete manhole installation, generally indicated by the numeral 10 includes the base 12 and risers 14. This manhole installation is conventional and may conform to that disclosed in U.S. Pat. No. 3,759,280. As shown more clearly in FIG. 1, a pipe 16 penetrates into the chamber 18 of the manhole via a porthole 20 in the wall thereof. While the drawings show the pipe 16 as protruding beyond the inner wall of the chamber 18, it may be positioned flush therewith or even inside without departing from the spirit and scope of this invention.

Figure 3:
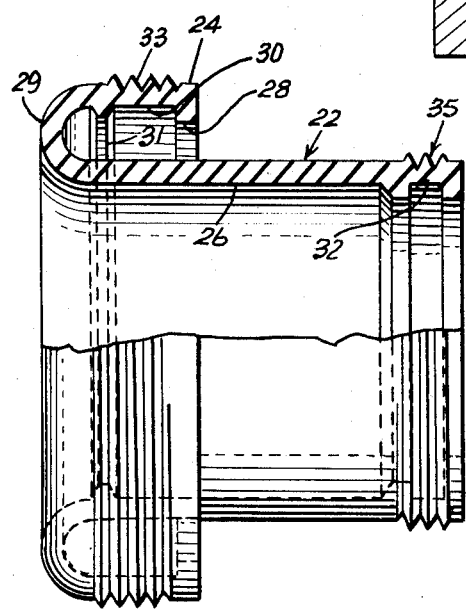
FIG. 3 is a side view, partly sectioned, of an elastomeric gasket of this invention.

To seal pipe 16 within the hole 20, a gasket apparatus is employed which is shown more clearly in FIGS. 3, 4 and 5. The gasket device includes an elongated sleeve 22 of resilient, elastomeric material, such as rubber, neoprene or suitable plastic, provided at the left end with a reflexly curved annular flange 24 connected to the turbular body portion 26 thereof by means of a C-shaped annular section 29. The flange 24 has an annular, inwardly extending rib 28 which forms with a second annular rib 31 spaced axially therefrom and with the inner peripheral surface of the flange 24 an annular recess 30.

The body portion 26 may be of uniform diameter from end to end or alternatively may be tapered either outwardly or inwardly. As shown, it is of uniform diameter, being provided at the distal end with a circumferential groove on the inside thereof for receiving an adjustable clamping ring 34 (FIG. 1). The sleeve 22 is formed by extruding a strip of rubber to the cross-sectional shape shown in FIG. 3, cutting a length therefrom, forming an annulus of the length and vulcanizing the abutting edges.

The clamping ring 34 is of conventional design and may be the same as that shown in either U.S. Pat. No. 3,759,280 or 3,958,313. In one form, it utilized a threaded shaft resembling a screw provided with a head 36 slotted to receive a screwdriver whereby the band 34 may be altered in diameter and adjusted to provide a circumferential clamping force as is conventional.

The gasket device of FIG. 3 is provided with coaxial grooves 33 on the flange exterior and grooves 35 on the end of the body portion 26, the grooves 33 being radially opposite the recess 30 and the grooves 35 radially opposite the groove 32.

The flexibility of the gasket device thus described is such that it may be turned inside out to the shape of that shown in FIG. 4 wherein the grooves 30 and 32 switch radial positions, it being desired that the groove 32 be on the outside of the resulting tubular sleeve and the groove 30 on the inside.

In cross-section, the grooves 33 and 35 appear as serrations and serve a purpose which will become obvious from the description that follows. It is important that the flexibility of the wall of the gasket device is such that when it is turned inside out, it will assume the shape of FIG. 4, i.e., the flange 24 will coaxially extend beyond the body portion 26 to provide a tubular sleeve which is self-supporting. In other words, once turned inside out, the flange 24 will not spring back to the original shape of FIG. 3, but will remain in its extended condition.

Instead of the flange 24 surrounding the body portion 26, it may encircle the inside, in this instance groove 30 being on the inner peripheral surface of flange 24. Further, with the flange 24 turned inside, the grooves 30 and 32 may be positioned on the outside of body portion 26 and flange 24. For all of these original shapes in which the grooves face a common direction, the gasket may be turned inside out to position groove 30 on the inside and groove 32 on the outside.

A reinforcing ring 38 of steel or plastic and which is not transversely split is inserted into the cavity 30 of the tubular sleeve of FIG. 4 in the position as indicated in FIGS. 2, 5 and 6. This ring 38 is of band or tubular configuration and in one embodiment is of uniform diameter. Once it is fitted into the cavity 30, it establishes the outside diameter of the flange 24 which is larger than the outside diameter of the body portion 26. With the body portion 26 being longer than the flange 24 and the ring 38 in place, the body portion 26 will remain inside out thereby forming the sleeve assembly as shown in FIGS. 2 and 5. The band 38 is retained in the annular cavity 30, just fitting therein, by means of the ribs 28 and 31.

The installation of an assembled sleeve 22 and ring 38 into a porthole 20 will now be explained. The sleeve 22 with the ring 38 installed within the flange 24 as an assembly may be installed in the porthole 20 by utilizing one of the two following methods, the method selected depending upon the particular installer's preferance. In following the first method, as otherwise explained and illustrated in detail in the aforesaid Application Ser. No. 936,122, filed Aug. 23, 1978, the sleeve 22 with the ring 38 installed within the flange 24 as an assembly is inserted edgewise axially of the porthole 20. In other words, considering that the rib 28 defines a plane, this plane is arranged substantially parallel to the axis 40 of the porthole 20 and the assembly 22, 38 thus positioned is moved along the axis 40 until it is inserted into the porthole 20 a suitable distance. Since the porthole 20 is of smaller diameter than the flange 24, obviously some force will be required in inserting the sleeve assembly into the porthole 20.

Once inserted, the sleeve assembly 22, 38 is rotated until the assembly is positioned as shown in FIGS. 2, 5 and 6 with the sleeve assembly 22, 38 coaxial within the porthole 20, the ring 38 compressing the flange 24 against the wall of the porthole. Some force will be required in order to rotate the assembly into the position of FIGS. 2, 5 and 6, since the material of the flange 24, and more particularly, the annular serrations 33, will neccessarily deform when moved into final position. In this position, the material of flange 24 and the annular serrations 33 are under radial compression between the reinforcing ring 38 and the wall of the porthole 20. The sleeve assembly is thus frictionally fitted into intimate sealing engagement with the wall of hole 20 thereby retaining it in position.

A second method of installing the assembled sleeve 22 and ring 38 is to insert the assembly coaxially of the porthole 20 and then force it into place. Preferably, the assembly in inserted into hole 20 from the inside of the base 12. A suitably strong stick of wood, such as the end of a hammer handle, is positioned against the rib 28 and then impacted by a sledge hammer to drive it an increment into hole 20. This is repeated about the circumference of rib 28 until the flange 24 is driven into position in hole 20.

Instead of inserting the sleeve assembly into porthole 20 from the inside of base 12, it may be inserted from the outside with the gasket assembly in the form shown in FIG. 3. In this instance, the body portion 26 is first inserted into the hole 20 until the assembled flange 24 and ring 38 engage the hole. The flange is then driven into place as just explained until properly coaxially positioned within the hole. The body portion 26 of a sleeve is then pulled back through the hole 20 thereby to extend outwardly thereof as shown in FIG. 2, the sleeve then assuming the shape shown in FIG. 4.

As shown in FIG. 2, the distal portion 26 projects beyond the outer wall of the base 12 there to receive the end portion of an underground pipe 16 which may be of plastic, concrete or the like. Once the pipe 16 is inserted to the position shown in FIG. 2, the clamping ring 34 (FIGS. 1 and 2) is installed in the groove 32 and the clamping screw 36 adjusted to clamp tightly the end of the sleeve 22 around the pipe 16 to provide a seal, the annular serrations 35 being deformed against the pipe. As shown in FIG. 2, the end of the pipe 16 is thus supported centrally of the porthole 20 with the space between the pipe 16 and the wall of the porthole being sealed by the gasket assembly.

While the ring 38 has thus far been described as being solid and not split transversely, it may be split provided the ends are securely held together by means of a suitable retainer, such as a metallic band (not shown) wrapped therearound as otherwise disclosed in the aforesaid Application Ser. No. 936,122, filed Aug. 23, 1978. The ring being split or solid, it is only required that it be relatively strong and inflexible thereby to hold the flange 24 in sealing engagement with the wall of porthole 20.

In order to protect the metallic ring 38 against corrosion, it may be desired to encase it in ninety durometer rubber or the equivalent. This may be accomplished by vulcanizing a rubber sleeve onto the ring 38 or alternatively by dipping the ring 38 in a liquid plastic and permitting the coating to dry or cure.

Once the pipe 16 is installed, it can be universally angled with respect to the hole 20 by reason of the flexibility of the sleeve 22. Lateral movement of the pipe 16 with respect to the wall of the hole 20 may occur except as radially limited by the radial thickness of the assembly of the ring 38 and flange 24.

Dimensions of a working embodiment of this invention, which are exemplary only and not limitative of this invention, may be the same as given in the aforesaid Application Ser. No. 936,122, filed Aug. 23, 1978.

While there have been described above the principles of this invention in connection with specific apparatus, it is to be clearly understood that this description is made only by way of example and not as a limitation to the scope of the invention.

What is claimed is:

1. The method of making a sleeve-shaped gasket of elastomeric material comprising the steps of
   (a) forming a gasket of elastomeric material to a shape having a sleeve-like body with a reflexly turned flange on the end thereof which encircles at least a portion of said body with a first annular coaxial rib on the inner surface of said flange adjacent the end thereof, and with a second annular coaxial rib on the inner surface of said body adjacent the end opposite said flange, and
   (b) turning said gasket inside out thereby to relocate said flange as a tubular coaxial extension of said sleeve-like body and further to position said first rib on the inside of said flange and the second rib on the outside of said body of the extended body and flange.

2. The method of claim 1 including forming two additional ribs on both the flange and body respectively, in axially spaced relation from the first and second ribs thereby to form annular recesses on both the flange and body.

3. The method of claim 1 wherein said gasket is formed by first extruding a strip of rubber to a longitudinal sectional shape of said flange and body, forming said strip into an annulus with the ends abutting with the flange on the outside of the sleeve-like body, and securing said ends together.

4. The method of claim 1 wherein said ends are vulcanized together.

* * * * *